Oct. 8, 1929.  F. J. MILLER  1,730,676
BRAKE FOR HAND TRUCKS
Filed Aug. 25, 1928  2 Sheets-Sheet 1
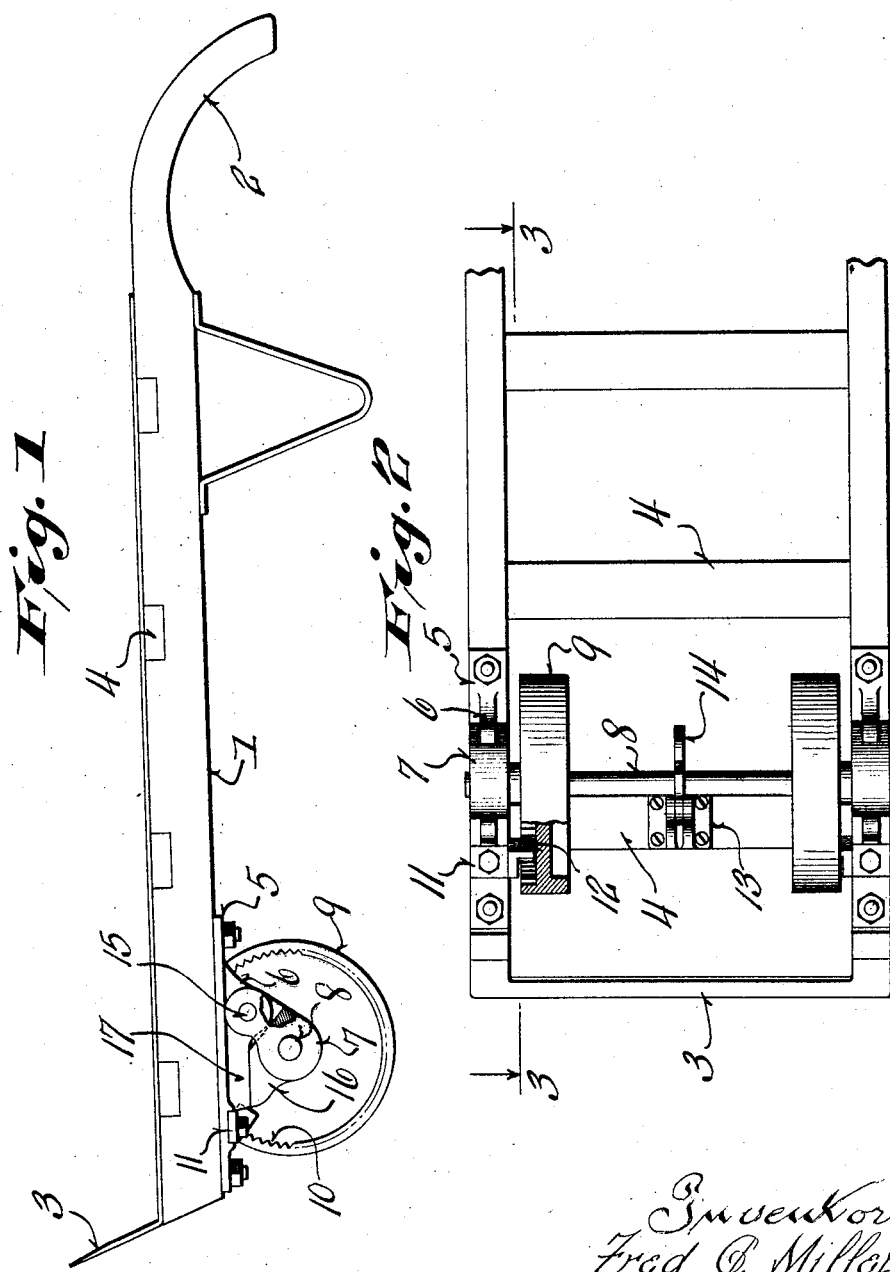

Oct. 8, 1929.   F. J. MILLER   1,730,676
BRAKE FOR HAND TRUCKS
Filed Aug. 25, 1928    2 Sheets-Sheet 2
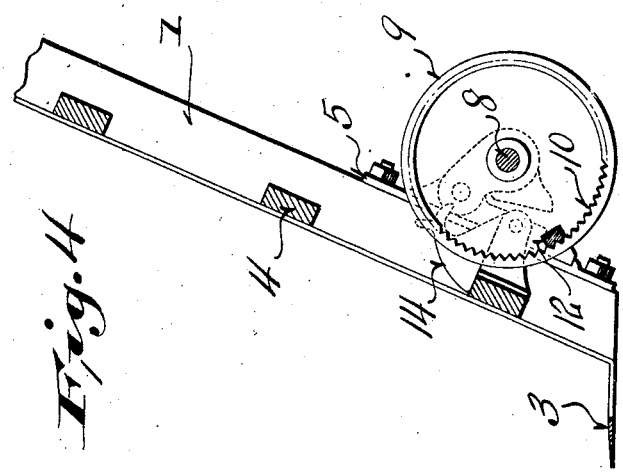
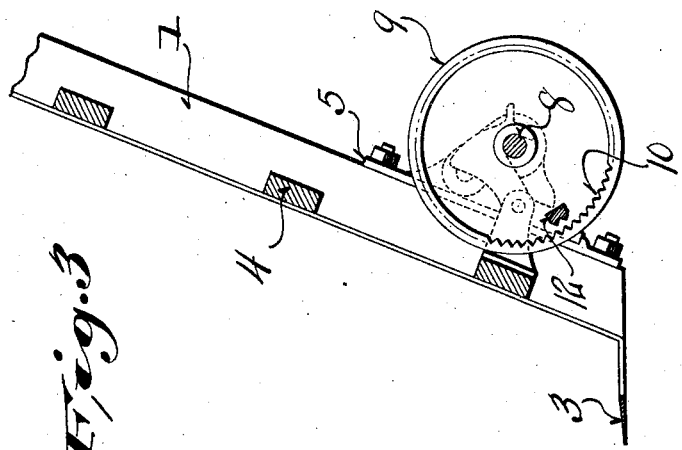
Inventor
Fred J. Miller Patented Oct. 8, 1929

1,730,676

UNITED STATES PATENT OFFICE

FRED J. MILLER, OF APPLETON, WISCONSIN

BRAKE FOR HAND TRUCKS

Application filed August 25, 1928. Serial No. 302,012.

This invention relates to hand trucks, and is particularly directed to hand trucks of the two wheel type.

This invention is an improvement over that disclosed in my copending application for Hand trucks, filed May 31, 1928, Serial No. 281,977.

Objects of this invention are to provide a novel form of hand truck in which the braking of the wheels is automatically accomplished while the load is being picked up, and in which the braking is released when the truck is rocked into load transporting position.

Further objects are to provide a truck in which the braking is more in the nature of an actual locking of the wheels against rotation than a frictional grip thereon, so as to insure against turning of the wheels when the truck is picking the load up, thus materially aiding the operator in manipulating the truck.

A further object of the invention is to provide means for locking the wheels against braking when it is so desired, and to so provide the means that it may be readily released by the foot of the operator without requiring him to loosen his hold upon the handles of the truck.

Further objects are to provide a very simple type of hand truck in which the wheels are movably carried with reference to the truck, so as to permit a slight motion of the wheels with reference to the truck to accomplish the braking or locking and the release thereof.

An embodiment of the invention is shown in the accompanying drawings in which:

Figure 1 is a side view of the truck as it appears when transporting a load, with parts broken away;

Figure 2 is a view from the underside of the structure shown in Figure 1;

Figure 3 is a sectional view on the line 3—3 of Figure 2 showing the wheels held against braking;

Figure 4 is a corresponding view showing the wheels in braking position.

Referring to the drawings, it will be seen that the truck comprises a pair of side frame bars 1 which are provided with handles 2 and with the usual foot or pick-up portion 3. The truck is further provided with the usual transverse bars 4.

Each side bar carries on its underside a bracket 5 which is provided with a tongue 6. These tongues are pivotally received between the ears or links 7. These links are relatively short and carry at their outer ends the transverse axle 8 of the wheels 9. These wheels are provided with outwardly projecting overhanging flanges whose underfaces are serrated or notched, as indicated at 10.

Further, it will be noted, particularly from Figures 1 and 2, that each bracket 5 is provided with a recess which receives a casting 11, such casting being provided with an outwardly projecting tongue 12, provided with teeth, as shown in Figure 3, cooperating with the notched portions 10 of the wheels. These members 11, or locking lugs, are held by one of the bolts which retain the brackets in place or, if desired, they may be held by a cap screw extending into the bracket although the first construction is preferred.

In addition to the structure thus far described, the truck is provided with a small bracket 13 which is secured to one of the transverse bars 4, as shown in Figure 2, and is provided with a pivoted latch 14. This latch has a hook-like portion which is adapted to engage the axle 8 or transverse shaft and to retain it against rearward motion, as shown, for instance, in Figure 3. The latch 14 may be readily detached by the foot of the operator when it is desired to allow braking or locking, as shown in Figure 4. This braking or locking is secured automatically when the truck is rocked into load receiving position. When rocked into this position, the wheels bodily move backwardly with reference to the body of the truck and, as will be seen from Figure 4, cause the teeth or notches 10 to interlock with the teeth of the locking lugs 12. This positively locks the wheel and produces the desired braking action.

The truck may now be rocked about the axis of the shaft without danger of rotation of the wheels with consequent misplacement of the truck during the load receiving operation. When the truck is rocked downwardly into load transporting position, the center line of the pivots 15 of the links 7 will pass rearwardly of the center line of the axle 8, as shown in Figure 1, and consequently the links will rock forwardly and cause a forward travel of the wheel with reference to the truck, thus moving the notched or toothed portions of the wheels out of engagement with the lugs 12 and allowing free transporting of the truck and load.

If for any reason, it is not desired to have this braking action, the operator merely allows the catch 14 to drop into the position shown in Figure 3, and to thus retain the wheels and axle against bodily moving with reference to the truck.

Each of the links 7 is provided with a bearing foot 16 which contacts with a bearing portion 17 formed on each bracket 5. These bearing portions are relatively extended so that they will have a long life and only a relatively small pressure per unit area will exist when the bearing portions are in contact.

It will be seen that this invention provides for the braking or positive locking of the wheels against relative motion with respect to the truck and against rotation and thus prevents the sudden rolling of the truck away from the load during the load receiving operation.

It will also be seen that the wheels are automatically unlocked when the truck is rocked into load transporting position.

While it is preferred to use the latch, it is apparent that the latch is not absolutely essential to this invention, as it may be omitted under certain conditions. However, the latch insures the holding of the wheels against interlocking with the lugs during the transportation of the load and it is preferable to use it. Also, it is obvious that the latch can be operated by other means than the foot of the operator without departing from the spirit of the invention.

It will be seen that the truck materially facilitates the picking up of the load as there is no danger of the sudden shifting of the truck with consequent inconvenience or damage to the operator as has heretofore been the case. Further, the wheels are positively locked during load receiving operation and consequently there can be no possible chance of slipping of the wheels.

Although the invention has been described in considerable detail, such description is intended as illustrative rather than limiting as the invention may be variously embodied and as the scope of such invention is to be determined as claimed.

I claim:

1. A hand truck comprising a frame, a pair of wheels for supporting the truck, means interposed between said wheels and said truck and movably supporting said wheels, and means for positively locking said wheels when said wheels move into one position.

2. A hand truck comprising a frame, a pair of wheels for supporting the truck, means interposed between said wheels and said truck and movably supporting said wheels, and means carried by said truck for automatically positively locking said wheels when said wheels move into one position.

3. A hand truck comprising a frame, a pair of wheels shiftably carried by said frame, and means for automatically positively locking said wheels when said truck is moved to load-receiving position.

4. A hand truck comprising a frame, a pair of wheels shiftably carried by said frame, means for automatically positively locking said wheels when said truck is moved to load-receiving position, and means for temporarily preventing the locking of said wheels.

5. A hand truck comprising a frame, a pair of wheels shiftably carried by said frame, means carried by said frame for positively locking said wheels when said wheels shift into one position, and releasable means for temporarily preventing shifting of said wheels.

6. A hand truck comprising a frame, a pair of brackets carried by said frame, a pair of links pivoted to said brackets, an axle carried by the free ends of said links, a pair of wheels carried by said axle and having teeth formed thereon, and a pair of lugs rigid with respect to said frame and having teeth adapted to interlock with the teeth formed on said wheels when said links swing into one position.

7. A hand truck comprising a frame, a pair of brackets carried by said frame, a pair of links pivoted to said brackets, an axle carried by the free ends of said links, a pair of wheels carried by said axle and having teeth formed thereon, a pair of lugs rigid with respect to said frame and having teeth adapted to interlock with the teeth formed on said wheels when said links swing into one position, and a releasable latch adapted to engage said axle and prevent swinging of said links.

In testimony that I claim the foregoing I have hereunto set my hand at Appleton, in the county of Outagamie and State of Wisconsin.

FRED J. MILLER.